US012515930B2

(12) United States Patent
Arita et al.

(10) Patent No.: US 12,515,930 B2
(45) Date of Patent: Jan. 6, 2026

(54) JACK DEVICE AND WORK MACHINE EQUIPPED WITH JACK DEVICE

(71) Applicant: KOBELCO CONSTRUCTION MACHINERY CO., LTD., Hiroshima (JP)

(72) Inventors: Ryuichi Arita, Hyogo (JP); Takuro Kishi, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 370 days.

(21) Appl. No.: 18/041,481

(22) PCT Filed: Aug. 25, 2021

(86) PCT No.: PCT/JP2021/031186
§ 371 (c)(1),
(2) Date: Feb. 13, 2023

(87) PCT Pub. No.: WO2022/054581
PCT Pub. Date: Mar. 17, 2022

(65) Prior Publication Data

US 2023/0339733 A1    Oct. 26, 2023

(30) Foreign Application Priority Data

Sep. 11, 2020 (JP) ................................ 2020-153125

(51) Int. Cl.
*B66F 3/38* (2006.01)
*B66F 3/26* (2006.01)
*E02F 9/08* (2006.01)

(52) U.S. Cl.
CPC .................. *B66F 3/38* (2013.01); *B66F 3/26* (2013.01); *E02F 9/085* (2013.01)

(58) Field of Classification Search
CPC .......... B60S 9/02–12; B60S 9/14; B60S 9/20; B66F 7/16; B66F 7/20; B66F 7/08; B66F 7/085; B66F 9/07559; E02F 9/085
See application file for complete search history.

(56) References Cited

U.S. PATENT DOCUMENTS 3,175,698 A * 3/1965 Dassler .................. B66C 23/80
212/304
4,593,932 A * 6/1986 Miyazawa ............. B66C 23/80
280/765.1

(Continued)

FOREIGN PATENT DOCUMENTS

EP 1 209 118 A1 5/2002
EP 3 628 553 A1 4/2020

(Continued)

OTHER PUBLICATIONS

Machine Translation and Original Patent of WO 2010032536A1 (Year: 2010).*

(Continued)

*Primary Examiner* — Tyrone V Hall, Jr.
(74) *Attorney, Agent, or Firm* — Oblon, McClelland, Maier & Neustadt, L.L.P.

(57) ABSTRACT

Provided is a jack device easily storable in a storage space of a machine body of a work machine. The jack device includes an arm, a cylinder, a float and a pin. The arm is rotatably connected to the machine body. The cylinder is connected to the arm rotatably about a cylinder rotary axis so as to have an upright posture and a tilt posture. The pin rotatably connects the float to a rod of the cylinder. The jack device is stored in a state where the cylinder is contracted and in the tilt posture and the bottom surface of the float lies along a facing part of the machine body that faces the storage space.

8 Claims, 9 Drawing Sheets

(56) References Cited

U.S. PATENT DOCUMENTS

| | | | | |
|---|---|---|---|---|
| 5,335,891 A * | 8/1994 | Gibert | B60P 1/6409 | |
| | | | 280/765.1 | |
| 2018/0170322 A1* | 6/2018 | Gallione | B66C 23/80 | |

FOREIGN PATENT DOCUMENTS

| | | | |
|---|---|---|---|
| JP | 4-169364 | A | 6/1992 |
| JP | 2009-120297 | A | 6/2009 |
| JP | 2017-141075 | A | 8/2017 |
| JP | 2017-154847 | A | 9/2017 |
| JP | 2018-103758 | A | 7/2018 |
| JP | 2018-176907 | A | 11/2018 |
| JP | 2018-177432 | A | 11/2018 |
| JP | 2019-14573 | A | 1/2019 |

OTHER PUBLICATIONS

Extended European Search Report issued Dec. 8, 2023 in European Patent Application No. 21866541.2, 8 pages.

International Search Report issued Nov. 22, 2021 in PCT/JP2021/031186 filed Aug. 25, 2021, 3 pages.

* cited by examiner

JACK DEVICE AND WORK MACHINE EQUIPPED WITH JACK DEVICE

TECHNICAL FIELD

The present invention relates to a jack device to be provided in a work machine including a machine body to lift up the machine body, and a work machine including the same.

BACKGROUND ART

Conventionally known are jack devices described in, for example, Patent Literatures 1 and 2. Each of the jack devices described in the literatures 1 and 2 includes an arm, a cylinder, and a float. The arm is attached to a machine body of the work machine. The cylinder includes a tube and a rod, attached to the arm. The float is attached to the tip of the rod.

The jack device is required to be stored in a small storage space provided in the machine body. There may be, however, a case where the jack device cannot be stored in the storage space in a state where the rod of the cylinder is attached with the float. To be stored in the storage space, therefore, each of the jack devices described in Patent Literatures 1 and 2 requires the detachment of the float from the rod. This increases the labor of the work for the storage. Although a device is described in each of Patent Literatures 1 and 2 for assisting the float to be attached to and detached from the rod, the necessity of the attachment and detachment cannot be eliminated.

CITATION LIST

Patent Literature

Patent Literature 1: Japanese Unexamined Patent Publication No. 2018-176907

Patent Literature 2: Japanese Unexamined Patent Publication No. 2018-177432

SUMMARY OF INVENTION

It is an object of the present invention to provide a jack device to be provided in a work machine capably of being easily stored in a machine body of the work machine, and a work machine provided with the same.

Provided is a jack device to be mounted on a machine body of a work machine to lift up the machine body. The machine body defines a storage space for storing the jack device. The jack device includes an arm, a cylinder, a float, and a pin. The arm is connectable to the machine body rotatably about an arm rotation axis. The arm rotation axis extends in a machine up-down direction, which is an up-down direction of the machine body. The cylinder includes a tube and a rod. The tube holds the rod so as to allow the rod to be moved relatively to the tube in a cylinder expansion-contraction direction. The entire cylinder is expanded and contracted in the cylinder expansion-contraction direction by a relative movement of the rod to the tube. The tube is connected to the arm so as to allow the cylinder to rotate about a cylinder rotation axis to have an upright posture and a tilt posture. The float has a bottom surface placeable on the ground. The pin connects the float to a lower end of the rod so as to allow the float to rotate about a float rotation axis extending in a direction along the cylinder rotation axis. The upright posture is a posture where the cylinder expansion-contraction direction is parallel to the machine up-down direction. The tilt posture is a posture where the cylinder expansion-contraction direction is tilted from the machine up-down direction so as to allow the jack device to be stored in the storage space with a contraction of the cylinder in the cylinder expansion-contraction direction. The pin is configured to allow the float to rotate relatively to the rod enough to allow the bottom surface of the float of the jack device in the tilt posture to lie along a facing part of the machine body that faces the storage space to thereby allow the jack device to be stored in the storage space.

DETAILED DESCRIPTION

With reference to FIGS. 1 to 6, there will be described a jack device 20 according to a first embodiment of the present invention and a work machine 1 including the same.

Figure 1:
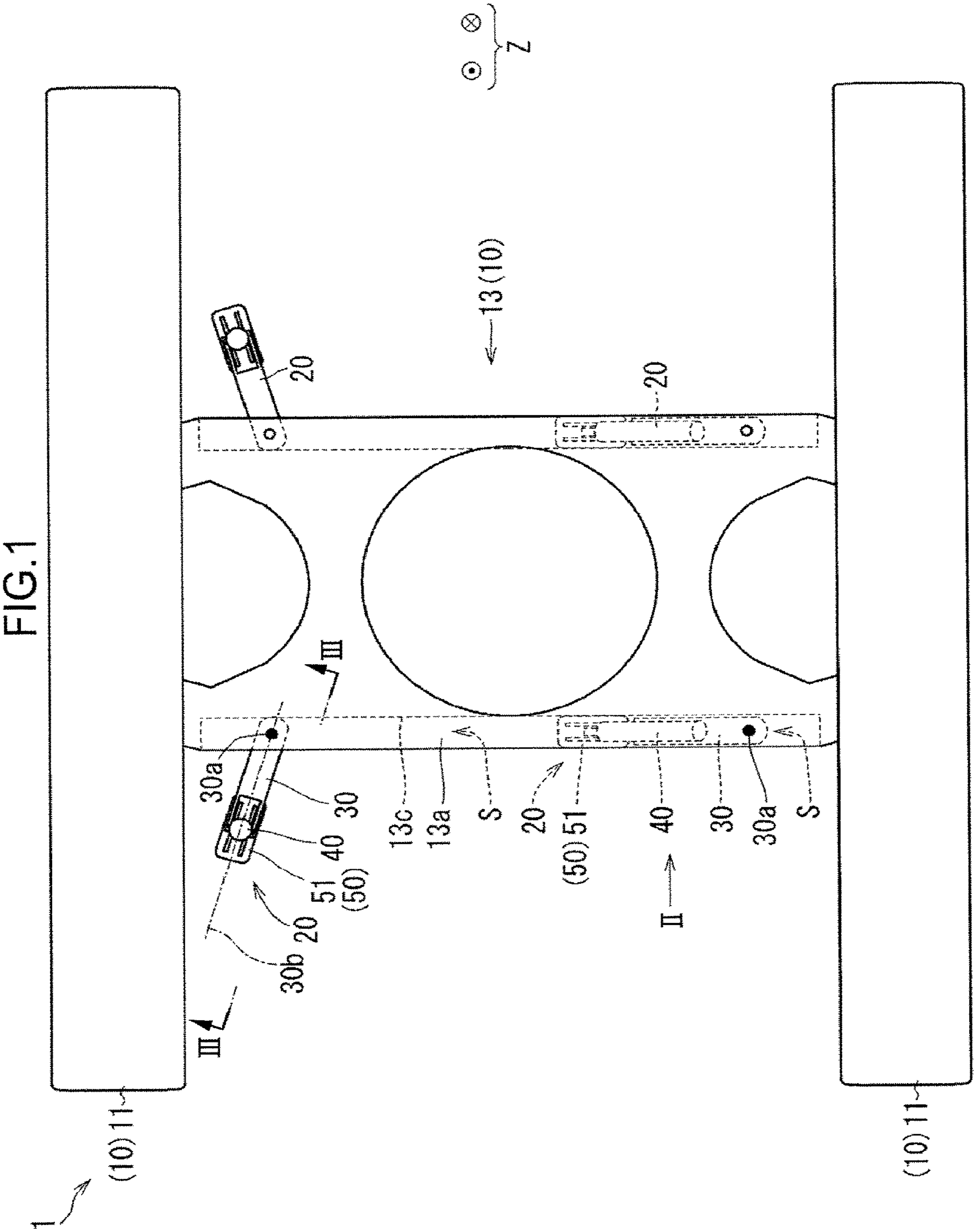
FIG. 1 is a plan view of a work machine including a plurality of jack devices according to a first embodiment of the present invention.

The work machine 1 shown in FIG. 1 is a machine for performing work, for example, a construction machine for performing a construction work. The work machine 1 may be, for example, either a crane or an excavator.

The work machine 1 includes a machine body 10 and a plurality of jack devices 20.

The machine body 10 is a main part of the work machine 1. The machine body 10 is, for example, a lower traveling body. The machine body 10 includes a pair of left and right crawlers 11 and a car body 13 disposed between the pair of crawlers 11. The pair of crawlers 11 make motions to allow the entire machine body 10 to travel along the ground. The machine body 10 has a machine up-down direction, a machine front-rear direction, and a machine lateral direction. The machine up-down direction is the up-down direction of the machine body 10, being a direction coincident with a vertical direction Z when the machine body 10 is placed on a horizontal plane. The following description is made about the case where the machine body 10 is placed on a horizontal plane. The machine front-rear direction is a direction orthogonal to the machine up-down direction and orthogonal to the machine lateral direction. The machine front-rear direction is, for example, a longitudinal direction of each of the crawlers 11. The machine lateral direction is a direction orthogonal to each of the machine up-down direction and the machine front-rear direction, for example, being the direction in which the pair of crawlers 11 are arranged.

On the car body 13 is mounted each of the jack devices 20. The plurality of jack devices 20, in this embodiment, include four jack devices 20, namely, left and right front-side jack devices 20 aligned in the machine lateral direction along the front side of the car body 13, and left and right rear-side jack devices 20 aligned in the machine lateral direction along the rear side of the car body 13. To the car body 13 are connected the pair of crawlers 11 disposed on both outer sides of the car body 13 in the machine lateral direction, i.e., left and right sides, respectively. On the car body 13 is mounted a not-graphically-shown upper turning body, for example, through a turning bearing.

Figure 2:
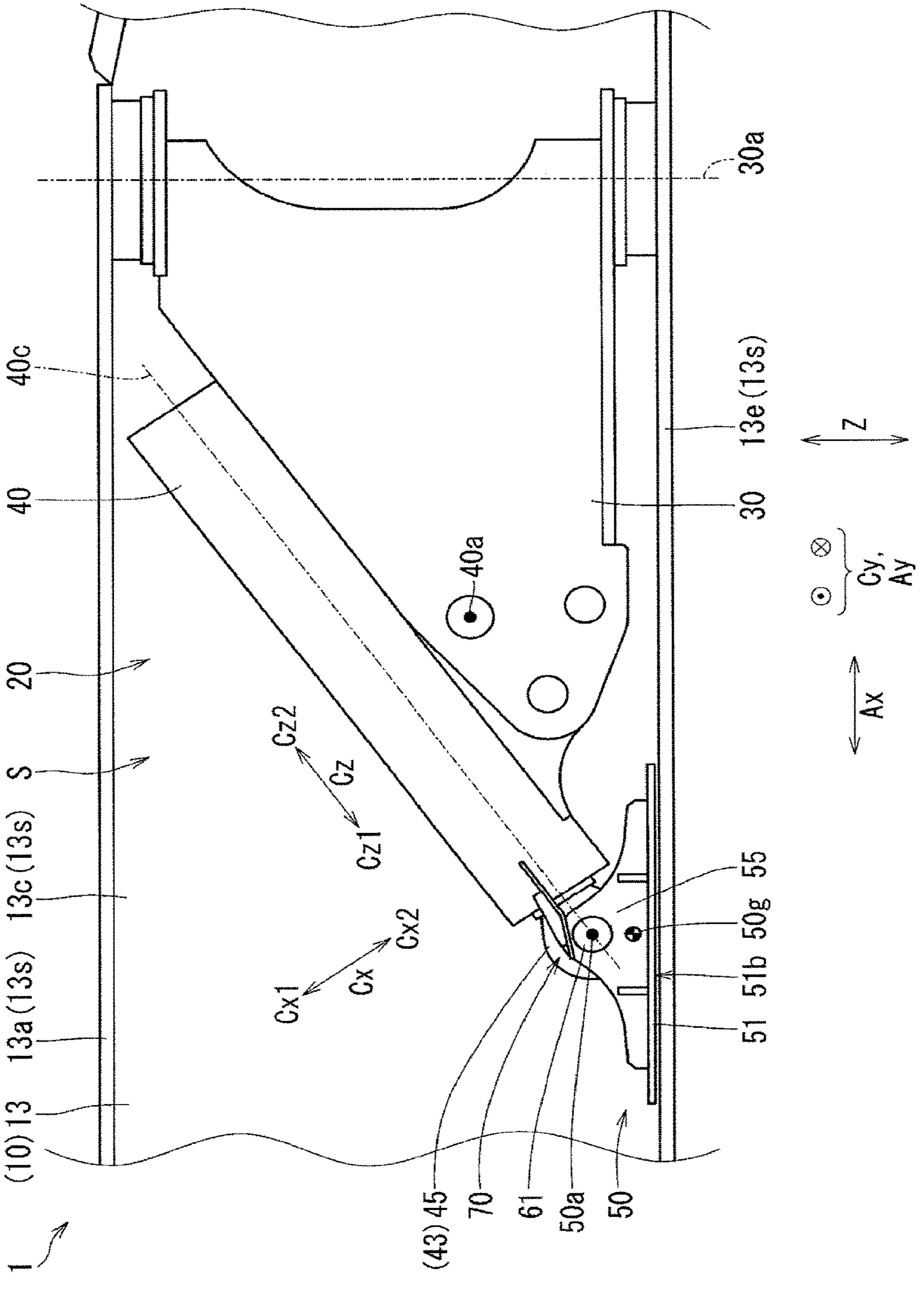
FIG. 2 is a front view of a jack device in a storage state out of the plurality of jack devices and a storage space for storing the jack device, which are viewed in a direction indicated by arrow II in FIG. 1.

The car body 13 includes a top wall 13*a*, a pair of front and rear side walls 13*c*, and a bottom wall 13*c* shown in FIG. 2.

The top wall 13*a* forms an upper part of the car body 13. The top wall 13*a* is composed of, for example, a plate material (top plate) extending in both the machine front-rear direction and the machine lateral direction. The top wall 13*a* has a horizontal lower surface.

The pair of side walls 13*c* form a front side part and a rear side part which are opposite ends of the car body 13 in the machine front-rear direction. The pair of side walls 13*c* are paralleled and spaced in the machine lateral direction. Each of the side walls 13*c* is composed of, for example, a plate material (side plate) extending in both the machine up-down direction and the machine lateral direction and orthogonal to the machine front-rear direction. Each of the side walls 13*c* has an outer surface and an inner surface that are vertical surfaces.

As shown in FIG. 2, the bottom wall 13*e* is a member that forms a lower part of the car body 13. The bottom wall 13*e* is composed of, for example, a plate material (bottom plate) extending in both the machine front-rear direction and the machine lateral direction. The bottom wall 13*e* is disposed under the top wall 13*a* at a distance in the machine-up-down direction from the top wall 13*a*. Each of the side walls 13*c* is disposed between the top wall 13*a* and the bottom wall 13*e*, having an upper end connected to the top wall 13*a* and a lower end connected to the bottom wall 13*e*. The bottom wall 13*e* has a horizontal upper surface.

Figure 3:
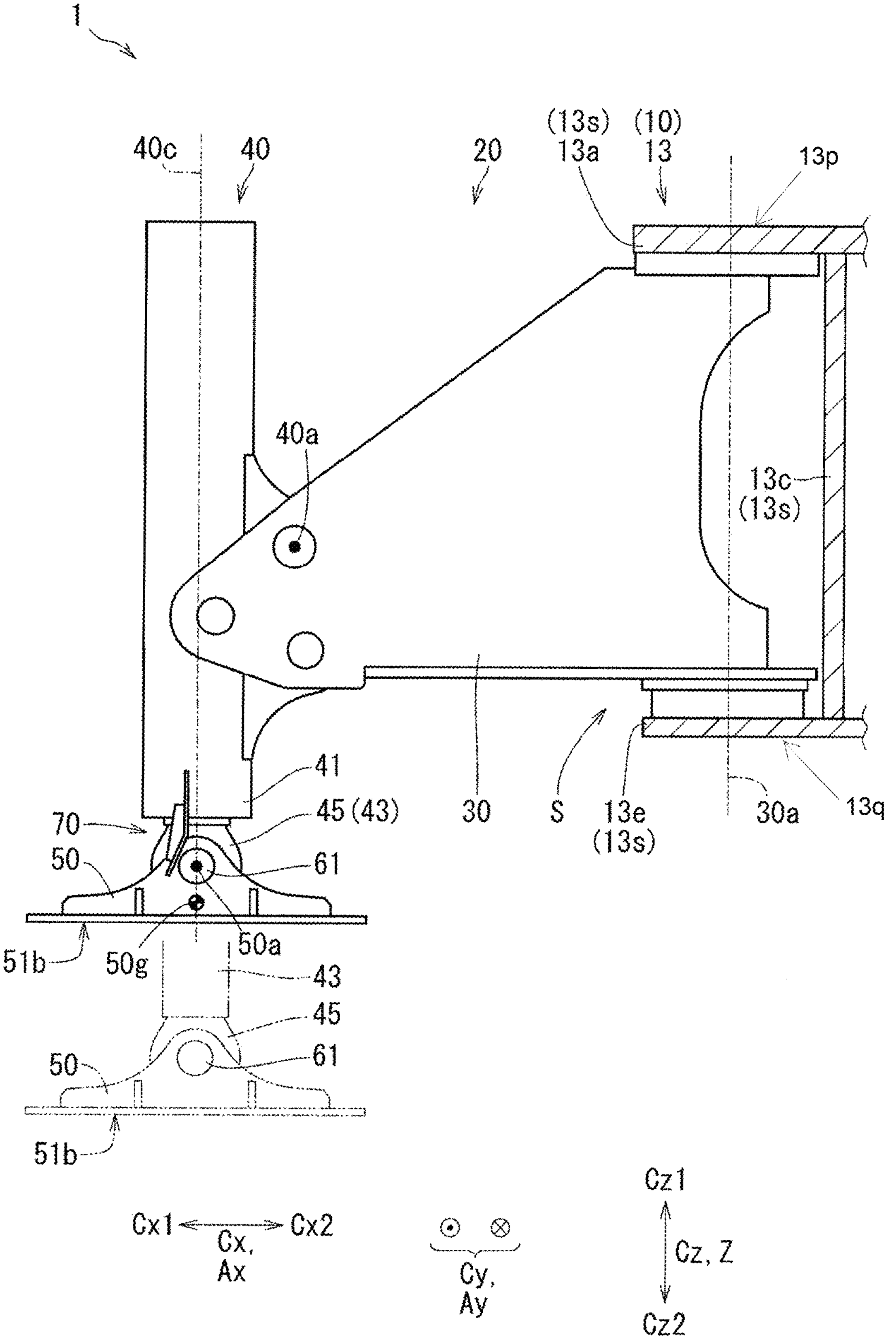
FIG. 3 is a cross-sectional view showing a jack device in a use state out of the plurality of jack devices, in the cross-section taken along line III-III in FIG. 1.

The front end of the top wall 13*a*, the front end of the bottom wall 13*e*, and the front side wall 13*c* out of the pair of side walls 13*c* define a front storage space S (on upper side in FIG. 1), while the rear end of the top wall 13*a*, the rear end of the bottom wall 13*e*, and the rear side wall 13*c* out of the pair of side walls 13*c* define a rear storage space S (on lower side in FIG. 1). In the front storage space S can be stored the left and right front-side jack devices 20 of the plurality of jack devices 20; in the rear storage space S can be stored the left and right rear-side jack devices 20 of the plurality of jack devices 20. FIGS. 2 and 3 show the rear storage space S.

Each of the top wall 13*a*, the bottom wall 13*e*, and the side wall 13*c* has a storage surface 13*s*, which faces the storage space S and defines the storage space S. Specifically, the top wall 13*a* includes a front end part and a rear end part which are upper projecting parts 13*p* that project horizontally (in the machine front-rear direction) beyond the pair of side walls 13*c*, and the bottom wall 13*e* includes a front end part and a rear end part which are lower projecting parts 13*q* that project horizontally (in the machine front-rear direction) beyond the pair of side walls 13*c*. The storage surfaces 13*s* include respective outer surfaces of the pair of side walls 13*c*, respective lower surfaces of the front end part and the rear end part of the top wall 13*a*, and respective top surfaces of the front end part and the rear end part of the bottom wall 13*e*. The outer surfaces of the pair of side walls 13*c* are the front side surface of the front side wall 13*c* and the rear side surface of the rear side wall 13*c*.

Each of the jack devices 20 is a device for lifting up, that is, raising relatively to the ground, the machine body 10 shown in FIG. 1. The jack device 20 is shiftable between a use state and a storage state. The storage state is a state where the jack device 20 is stored in the storage space S as shown in FIG. 2, to which state the jack device 20 is shifted during working and transportation of the work machine 1. The use state is a state where the jack device 20 is able to lift up the machine body 10 as shown in FIG. 3, to which state the jack device 20 is shifted during the assembly and disassembly of the work machine 1.

The plurality of jack devices 20 are mounted on the machine body 10, in this embodiment, on the car body 13, as described above. Each of the jack devices 20 includes an arm 30, a cylinder 40, a float 50, a pin 61, a bearing 63 shown in FIG. 5, and a rotation limiter 70.

The arm 30 interconnects the machine body 10 and the cylinder 40. The arm 30 is connected to the machine body 10 rotatably about an arm rotation axis 30*a*. The arm 30 is connected, for example, to the top wall 13*a* of the car body 13 or the vicinity thereof and to the bottom wall 13*e* or the vicinity thereof, through a not-graphically-shown vertical pin, being allowed to rotate about the center axis of the pin.

The arm rotation axis 30*a* extends in the machine up-down direction. The arm 30 has an arm center axis 30*b* shown in FIG. 1, which is orthogonal to the machine up-down direction and intersects the arm rotation axis 30*a*.

The arm 30 has an arm rotation-radius direction Ax and an arm width direction Ay. The arm rotation-radius direction Ax is a direction parallel to the rotation radius of rotation of the arm 30 about the arm rotation axis 30*a*, that is, a direction orthogonal to the rotation direction of the arm 30, being a direction parallel to the arm center axis 30*b* in this embodiment. The arm rotation-radius direction Ax, in this embodiment, is coincident with the longitudinal direction of the arm 30 when viewed along the machine up-down direction, namely, an arm longitudinal direction. The arm longitudinal direction does not have to be a direction in which the arm 30 has the largest dimension among the directions with respect to the arm 30. For example, the maximum length of the arm 30 in the machine up-down direction may be greater than the maximum length of the arm 30 in the arm longitudinal direction. The arm width direction Ay is a direction orthogonal to each of the arm rotation-radius direction Ax and the machine up-down direction, namely, the width direction of the arm 30. When the machine body 10 is placed on a horizontal plane, the arm width direction Ay is horizontal. The shape of the arm 30 when viewed along the arm width direction Ay, i.e., along the rotation direction of the arm 30, is not limited. The shape, according to the example shown in FIG. 2, is a shape where the dimension of the arm 30 in the machine-up-down direction is decreased with an increase in the distance from the arm rotation axis 30*a*, that is, toward the tip of the arm 30, for example, a substantially triangular shape.

The cylinder 40 is expandable and contractable in a cylinder expansion-contraction direction Cz, being, for example, a hydraulic cylinder. The cylinder expansion-contraction direction Cz, according to this embodiment, is the longitudinal direction of the cylinder 40. The cylinder 40 is connected to a predetermined part of the arm 30, specifically, a part away from the arm rotation axis 30*a*, rotatably about a cylinder rotation axis 40*a*. The cylinder 40 is shiftable between an upright posture shown in FIG. 3 and a tilt posture shown in FIG. 2 by the rotation thereof about the cylinder rotation axis 40*a*. The cylinder rotation axis 40*a* extends in a direction intersecting the machine up-down direction, preferably, in a direction orthogonal or substantially orthogonal to the machine up-down direction. The cylinder rotation axis 40*a* extends in a direction intersecting the arm rotation-radius direction Ax, preferably, in a direction orthogonal or substantially orthogonal to the arm rotation-radius direction Ax. The direction in which the cylinder rotation axis 40*a* extends is coincident or substantially coincident with the arm width direction Ay. The direction in which the cylinder rotation axis 40*a* extends may be inclined to the arm width direction Ay.

In the use state of the jack device 20, the cylinder 40 is shifted to the upright posture shown in FIG. 3. The upright posture is a posture where the cylinder expansion-contraction direction Cz, i.e., the longitudinal direction of the cylinder 40 in this embodiment, is the machine up-down direction or substantially parallel to the machine up-down direction.

In the storage state of the jack device 20, the cylinder 40 is shifted to the tilt posture shown in FIG. 2. The tilt posture is a posture where the cylinder expansion-contraction direction Cz is tilted from the machine up-down direction more greatly than the upright posture. The tilt posture according to this embodiment is a posture where the cylinder 40 extends along the upper surface of the arm 30. The cylinder expansion-contraction direction Cz in the tilt posture is tilted from both the horizontal direction and the vertical direction Z.

The cylinder 40 has a cylinder center axis 40*c*. The cylinder center axis 40*c* is the center axis of the cylinder 40, extending in the cylinder expansion-contraction direction Cz. The cylinder expansion-contraction direction Cz includes a cylinder contraction direction Cz1 and a cylinder expansion direction Cz2. The cylinder expansion direction Cz2 is a direction toward the float 50 from the cylinder 40, and the cylinder contraction direction Cz1 is a direction opposite to the cylinder expansion direction Cz2.

The cylinder 40 further has a cylinder width direction Cy and a cylinder front-rear direction Cx. The cylinder width direction Cy is the width direction of the cylinder 40, being coincident with the arm width direction Ay. The cylinder front-rear direction Cx is a direction orthogonal to each of the cylinder expansion-contraction direction Cz and the cylinder width direction Cy, being coincident with the arm rotation-radius direction Ax. Each of the cylinder width direction Cy and the cylinder front-rear direction Cx corresponds to a radius direction of the cylinder 40.

The cylinder front-rear direction Cx includes a cylinder front direction Cx1 and a cylinder rear direction Cx2. The cylinder rear direction Cx2 is a direction toward the arm rotation axis 30*a* from the cylinder 40 along the arm rotation-radius direction Ax in the state where the cylinder expansion-contraction direction Cz is parallel to the arm rotation axis 30*a*, and the cylinder front direction Cx1 is a direction opposite to the cylinder rear direction Cx2.

As shown in FIG. 3, the cylinder 40 has a tube 41 and a rod 43. The tube 41 is connected to the arm 30 rotatably about the cylinder rotation axis 40*a*. The tube 41, in this embodiment, is cylindrical with a center axis parallel to the cylinder expansion-contraction direction Cz. The rod 43 is disposed inside the tube 41. The tube 41 holds the rod 43 so as to allow the rod 43 to be moved relatively to the tube 41 axially of the rod 43, i.e., in the cylinder expansion-contraction direction Cz. The entire cylinder 40 is expanded by the relative movement of the rod 43 to the tube 41 in the cylinder expansion direction Cz2, and the entire cylinder 40 is contracted by the relative movement of the rod 43 to the tube 41 in the cylinder contraction direction Cz1. FIGS. 3, 4, 5, and 7 to 9 show a solid line indicating the most-contraction state where the cylinder 40 is most contracted, and a two-dot chain line indicating a state where the cylinder 40 is expanded compared with the most-contraction state.

The rod 43 includes a float connection part 45, to which the float 50 is connected. The float connection part 45 is formed of an end part of the rod 43 in the cylinder expansion direction Cz2 direction, that is, a distal end part of the rod 43, in other words, a lower end part of the rod 43 in the upright posture. The float connection part 45 has a bearing reception hole 44 shown in FIG. 5. The bearing reception hole 44 passes through the tip of the rod 43 in the cylinder width direction Cy. The bearing 63 is fixed to the float connection part 45 while received in the bearing reception hole 44.

The float 50 is placeable on the ground. The float 50 may be placed on the ground either across an interposed object, for example, a planking, or in direct contact with the ground. As shown in FIG. 3, the float 50 is connected to the lower end of the rod 43, specifically, the float connection part 45. The float 50 is connected to the rod 43 through the pin 61 rotatably about a float main rotation axis 50*a*. The float main rotation axis 50*a* is the center axis of the pin 61, extending in a direction along the cylinder rotation axis 40*a*. The "direction along the cylinder rotation axis 40*a*" is a direction parallel or substantially parallel to the cylinder rotation axis 40*a*. The float 50 is rotatable relatively to the rod 43 in a direction along the side surface of the arm 30, that is, a direction in which the arm rotation axis 30*a* extends and in the arm rotation-radius direction Ax. The float 50 is rotatable largely about the float main rotation axis 50*a* relatively to the rod 43. The float 50 is rotatable also in a rotation direction other than the direction of rotation about the float main rotation axis 50*a*, namely, an inclination following direction, within a predetermined angle range so as to be able to follow the inclination of the ground. The rotation is allowed by the bearing 63 shown in FIG. 5, as described below.

Figure 4:
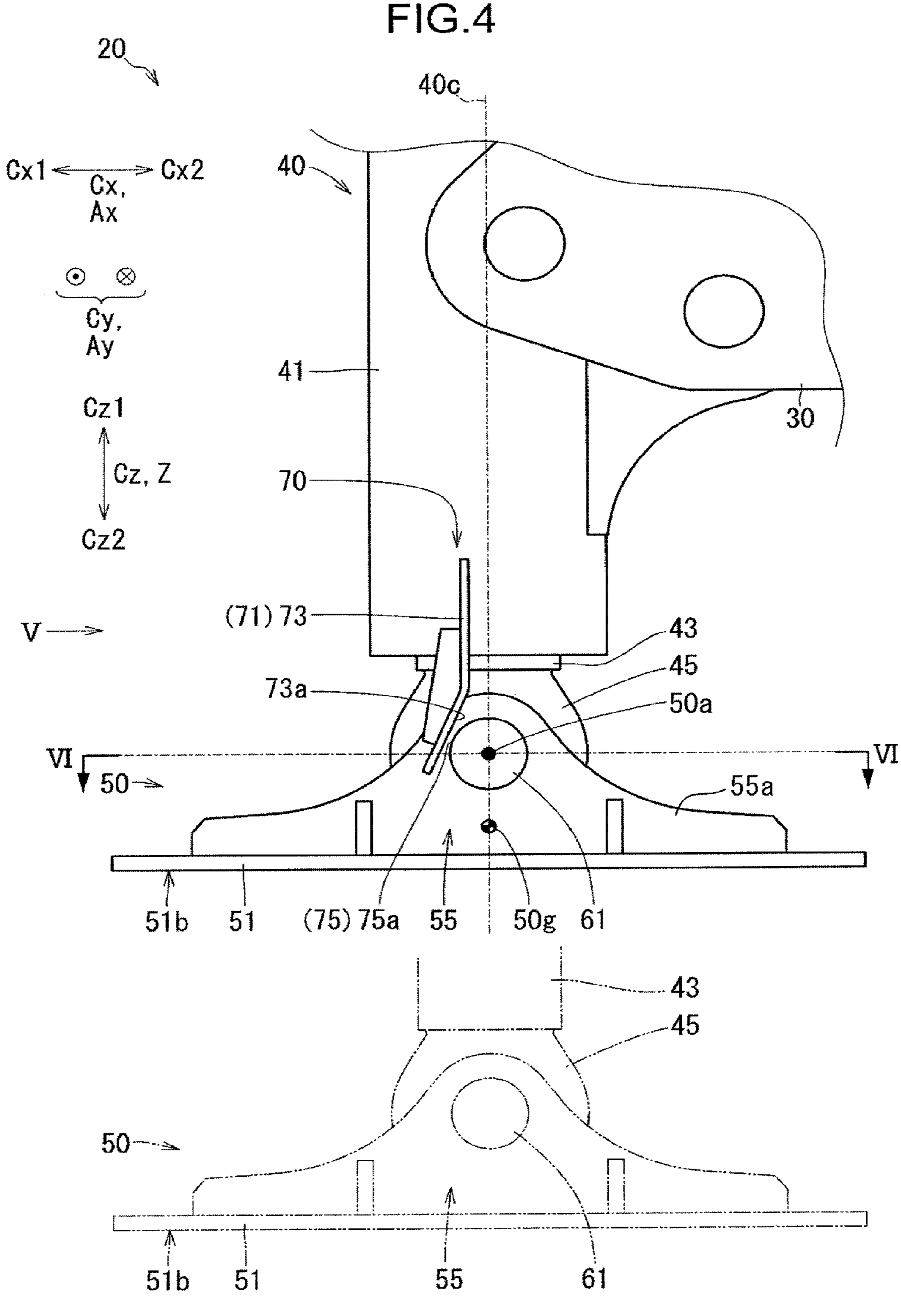
FIG. 4 is a view showing a float and a peripheral part therearound in the jack device shown in FIG. 3.

The float 50 includes a bottom surface 51*b*. The bottom surface 51*b*, in this embodiment, is a flat surface, being contactable directly with the ground surface or placeable on the ground surface across the interposed object. As shown in FIG. 4, the float 50 has a shape capable of maintaining a horizontal posture regardless of the rotation of the cylinder 40 about the cylinder rotation axis 40*a*, i.e., regardless of the tilt of the cylinder 40, the horizontal posture being a posture where the bottom surface 51*b* is horizontal or substantially horizontal. Specifically, the float 50 has a shape with the center of gravity 50*g* of the float 50 that is located directly below the pin 61 in the horizontal posture. The center of gravity 50*g* is, preferably, located at a position directly below the center axis of the pin 61 or therearound, most preferably, at the position directly below the center axis of the pin 61.

The float 50 has a float body part 51 and a rod connection part 55. Respective configurations thereof will be explained below with respect to the horizontal posture of the float 50, where the bottom surface 51*b* is horizontal.

Figure 6:
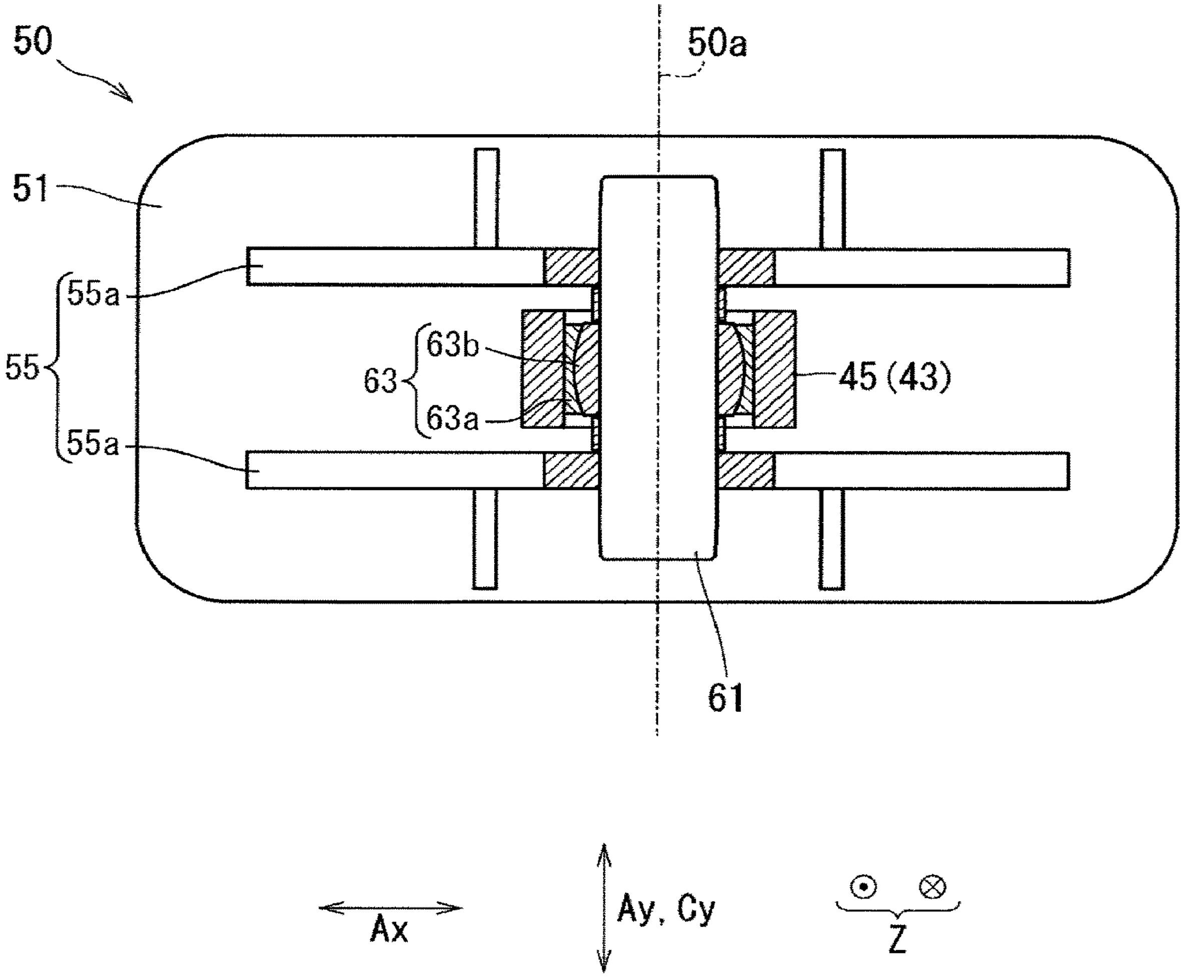
FIG. 6 is a plan view showing a cross-section taken along line VI-V1 of FIG. 4.

The float body part 51 forms a lower part of the float 50. The bottom surface 51*b* is the lower surface of the float body part 51. The float body part 51 preferably has a shape satisfying a storage condition and a stability condition. The storage condition is to allow the jack device 20 to be easily stored in the storage space S, as shown in FIG. 1. The stability condition is to allow the float body part 51 to have a large ground contact area in the use state, the ground contact area being an area of a contact part of the float body part 51 to come into contact with the ground (including the interposed object). Specifically, it is preferable that the float body part 51 has, for example, as shown in FIG. 6, a shape extending in the arm rotation-radius direction Ax. More preferably, the longitudinal direction of the float body part 51 is coincident or substantially coincident with the arm rotation-radius direction Ax. The shape of the float body part 51 viewed along the cylinder expansion-contraction direction Cz is arbitrary, which shape may be either substantially rectangular or substantially elliptical. The float body part 51 preferably has a width substantially equal to the width of the arm 30. The width of the arm 30 is the dimension of the arm 30 shown in FIG. 1 in the arm width direction Ay. The width of the float body part 51 is the dimension of the float body part 51 in the arm width direction Ay in the state where the longitudinal direction of the float body part 51 is coincident with the arm rotation-radius direction Ax.

Figure 5:
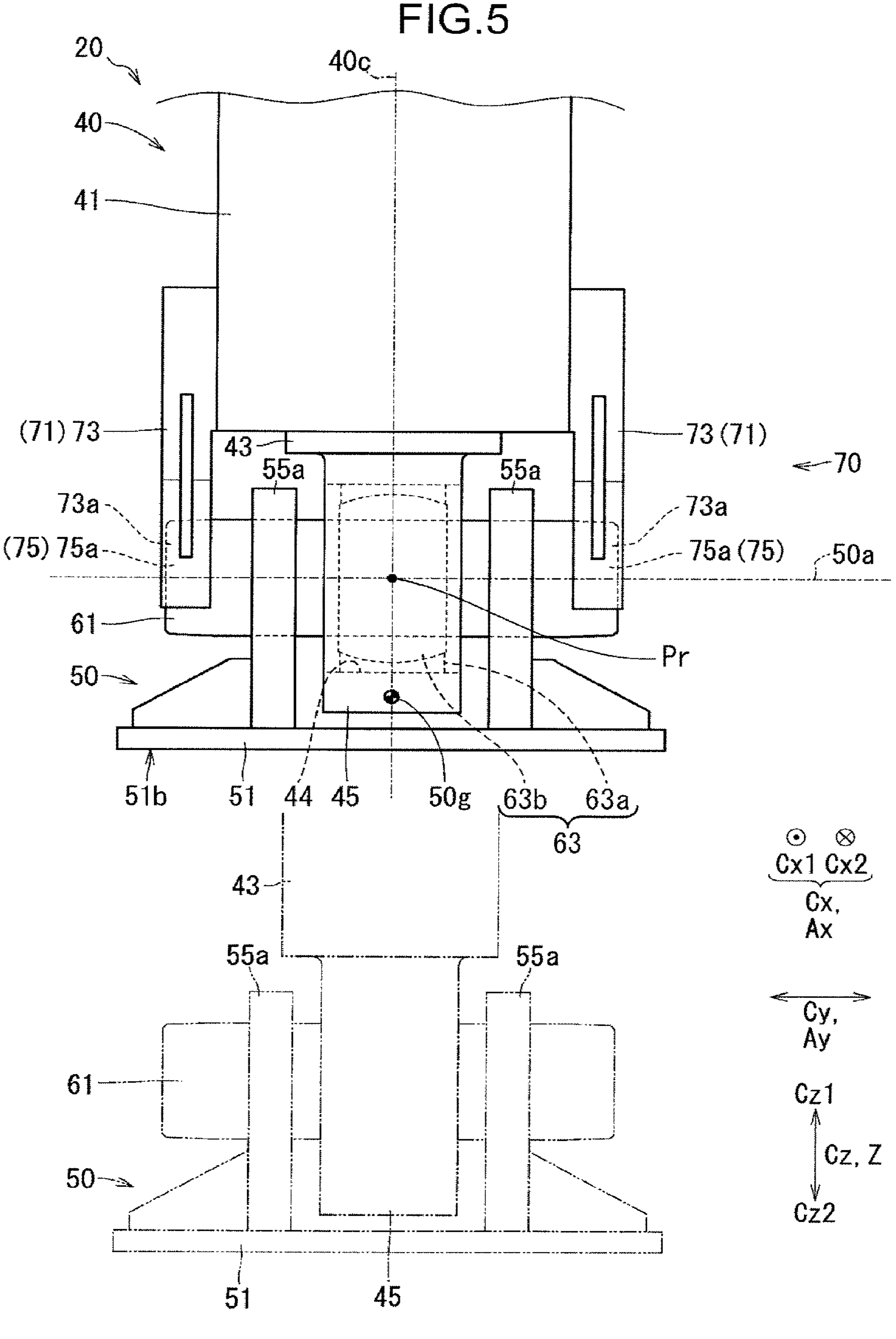
FIG. 5 is a view of the float and the peripheral part shown in FIG. 4 taken along the direction indicated by arrow IV in FIG. 4.

The rod connection part 55 is a part to be connected to the rod 43 as shown in FIG. 5. The rod connection part 55 is the upper part of the float 50. The rod connection part 55 protrudes upward from the float body part 51. The rod connection part 55 is constituted by a pair of vertical plates 55*a* in this embodiment, which are arranged so as to locate the float connection part 45, that is, the tip part of the rod 43 in the cylinder width direction Cy, therebetween. Each of the vertical plates 55*a* constituting the rod connection part 55 has a pin insertion hole, which penetrates the vertical plate 55*a* in the cylinder width direction Cy to allow the pin 61 to pass through the pin insertion hole in the cylinder width direction Cy. The rod connection part 55 and the float connection part 45 only has to be interconnectable through the pin 61, respective specific structures thereof being non-limited.

The pin 61 interconnects the rod 43 and the float 50. The pin 61 is substantially cylindrical or substantially columnar. The pin 61 has a pin center axis, being arranged so that the pin center axis extends in the cylinder width direction Cy or a direction substantially equal thereto.

The bearing 63 is interposed between the pin 61 and the float connection part 45 of the rod 43 to allow the pin 61 and the float 50 to rotate relatively to the rod 43 within a predetermined angle range to render the bottom surface 51*b* of the float 50 inclinable to follow the inclination of the ground. The relative rotation includes a rotation in a direction (inclination following direction) other than the direction of rotation of the float 50 about the float main rotation axis 50*a*, namely, the center axis of the pin 61. For example, the bearing 63 allows the pin 61 to make relative rotation to the rod 43 in any direction within a predetermined angle range. The bearing 63 is, for example, a spherical bearing, which is any of a spherical sliding bearing, a spherical roller bearing, a self-aligning bearing, and the like. The predetermined angle range is set so as to enable the float 50 to follow the maximum inclination assumable as the inclination of the ground with which the float 50 comes into contact.

The bearing 63 illustrated in FIGS. 5 and 6 includes an outer ring 63*a* fixed to the rod 43 and an inner ring 63*b* fixed to the pin 61. Specifically, the outer ring 63*a* is fixed to the float connection part 45, and the inner ring 63*b* is fixed to the outer peripheral surface of the pin 61. The inner ring 63*b* and the outer ring 63*a* are connected to each other capably of relative rotation. The relative rotation is a rotation about a rotation center point Pr, which is the intersection of the cylinder center axis 40*c* and the float main rotation axis 50*a*, i.e., the pin center axis.

The outer ring 63*a* is received in the bearing reception hole 44 formed in the float connection part 45, and the bearing reception hole 44 penetrates the float connection part 45 in the cylinder width direction Cy. The inner ring 63*b* encloses the pin insertion hole penetrating the inner ring 63*b* in the cylinder width direction Cy, and the inner ring 63*b* is fixed to the outer peripheral surface of the pin 61 which is being inserted into the pin insertion hole.

The outer ring 63*a* has a cylindrical shape enclosing the inner ring 63*b*. The outer ring 63*a* has an inner peripheral surface, which is a spherical concave surface having a center at the rotation center point Pr. The inner ring 63*h* has an outer peripheral surface, which is a spherical convex surface having a center at the rotation center point Pr. The outer ring 63*a* is capable of relative rotation to the inner ring 63*b* about the rotation center point Pr with contact between the outer peripheral surface and the inner peripheral surface. The bearing 63 thereby allows the pin 61 and the float 50 to rotate relatively to the rod 43 about the rotation center point Pr.

The rotation limiter 70 limits the rotation of the float 50 relative to the tube 41 about the cylinder center axis 40*c*. Specifically, the rotation limiter 70 is configured to limit the angle of rotation within a predetermined allowable angle range. The "allowable angle range" is such a range that the longitudinal direction of the float 50 of the jack device 20 in the storage state is coincident or substantially coincident with the arm rotation-radius direction Ax, namely, an initial angle range.

The rotation limiter 70 includes a first rotation limiting part 71 and a second rotation limiting part 75.

The first rotation limiting part 71 is provided on the tube 41. More specifically, the first rotation limiting part 71 includes a pair of rotation limiting members 73, 73 which are fixed to the tube 41, as shown in FIGS. 4 and 5. The pair of rotation limiting members 73, 73 are fixed, for example, to the outer peripheral surface of the tube 41. Each of the rotation limiting members 73, 73 protrudes in the cylinder expansion direction Cz2, i.e., downward in FIG. 4, beyond the end of the tube 41 in the cylinder expansion direction Cz2, that is, the lower end in FIG. 4.

The pair of rotation limiting members 73, 73 are disposed on both sides of the tube 41 in the cylinder width direction Cy, i.e., on both the left and right sides. Each of the rotation limiting members 73, 73 may be either plate-like or block-like. Each of the rotation limiting members 73, 73 includes a first contact part 73*a*, which is a part contactable with the second rotation limiting part 75. The first contact part 73*a* is inclined to the cylinder expansion-contraction direction Cz. For example, the first contact part 73*a* extends in a combined direction of the cylinder expansion direction Cz2 and the cylinder front direction Cx1, i.e., the lower left direction in FIG. 4. The first contact part 73*a*, alternately, though not graphically shown, may extend in a combined direction of the cylinder expansion direction Cz2 and the cylinder rear direction Cx2. Each of the rotation limiting members 73, 73, alternatively, may include a plurality of first contact parts. The plurality of first contact parts, for example, includes a contact part extending in a combined direction of the cylinder expansion direction Cz2 and the cylinder front direction Cx1, and a contact part extending in a combined direction of the cylinder expansion direction Cz2 and the cylinder rear direction Cx2.

The second rotation limiting part 75 is provided in a rotatable part of the jack device 20, which part is rotatable about the cylinder center axis 40*c* relatively to the tube 41. Specifically, the second rotation limiting part 75 may be provided to any of the pin 61, the rod 43, and the float 50. The second rotation limiting part 75 according to the present embodiment is provided to the pin 61, and more specifically, composed of a part of the pin 61. The second rotation limiting part 75 may be a member other than the pin 61 and fixed to the pin 61.

The second rotation limiting part 75 according to this embodiment includes a pair of second contact parts 75*a*. The pair of second contact parts 75*a* are parts contactable with respective first contact parts 73*a* of the pair of rotation limiting members 73, 73, respectively, so as to limit the rotation of the float 50 about the cylinder center axis 40*c*. Specifically, the pair of second contact parts 75*a* according to the present embodiment is a specific part of the outer peripheral surface of the pin 61. More specifically, the second contact parts 75*a* are parts of the outer peripheral surface of the pin 61, which parts are opposed to the respective first contact parts 73*a* of the rotation limiting members 73, 73, respectively, when the cylinder 40 is in a contraction state to a certain degree (e.g., the most contraction state). As shown in FIG. 5, the pair of second contact parts 75*a* are located on both outer sides of the pair of vertical plates 55*a* of the rod connection part 55 in the cylinder width direction Cy, i.e., on both left and right outer sides. In the example shown in FIG. 5, the pair of second contact parts 75*a* are located at both ends of the pin 61 in the longitudinal direction (the cylinder width direction Cy). In the example shown in FIG. 4, each of the second contact parts 75*a* is a part of the outer peripheral surface of the pin 61, the part facing in a composed direction of the cylinder contraction direction Cz1 and the cylinder front direction Cx1 (the upper left direction in FIG. 4). Each of the second contact parts 75*a* has a surface inclined to the cylinder expansion-contraction direction Cz. In the example shown in FIG. 4, each of the second contact parts 75*a* has a shape that is seen as an arc when viewed along the cylinder width direction Cy, the tangent of the arc extending in a composed direction of the cylinder expansion direction Cz2 and the cylinder front direction Cx1. The pair of second contact parts 75*a* having such circular arc shape can slide smoothly against the pair of first contact parts 73*a*, respectively The configuration of the rotation limiter 70, especially, the shape and arrangement thereof, is modifiable in various ways. For example, the second rotation limiting part 75 may be formed of either a part of the float 50 or a member fixed to the float 50. Although, in the example shown in FIG. 4, the first contact part 73*a* is planar and the second contact part 75*a* is arc-shaped (cylindrical surface shape) when viewed in the cylinder width direction Cy, it is also possible, for example, that the first contact part 73*a* is cylindrical and the second contact part 75*a* is planar. Besides, what limits the rotation angle about the cylinder center axis 40*c* of the float 50 relative to the tube 41 within a specific allowable angle range may be other than the rotation limiter 70. For example, it is also possible to provide a rotation limiting mechanism inside the cylinder 40 to limit the rotation angle of the float 50 to the tube 41 within the allowable angle range.

Next will be described the action of each of the jack devices 20.

The use state of the jack device 20 is as follows. As shown in FIG. 1, the arm 30 of the jack device 20 is projected beyond the machine body 10 to both outer sides in the machine front-rear direction, namely, the front and rear sides. For example, the arm 30 of the jack device 20 disposed on the front side of the machine body 10 is projected to the front side of the machine body 10. As shown in FIG. 3, the cylinder 40 of the jack device 20 is set into a posture where the cylinder expansion-contraction direction Cz of the cylinder 40 is vertical or substantially vertical, namely, the upright posture. The expansion of the cylinder 40 at such a position and in such a posture brings the bottom surface 51*b* of the float 50 into contact with the ground, enabling the jack device 20 to receive a reaction force from the ground to thereby lift up the machine body 10. Meanwhile, the bearing 63 allows the float 50 to make relative rotation to the rod 43 of the cylinder 40, thereby allowing the bottom surface 51*h* to be inclined to the horizontal plane following the inclination of the ground.

The jack device 20 can be shifted from the use state to the storage state shown in FIG. 2, as follows. The cylinder 40 is contracted to thereby separate the bottom surface 51*b* of the float 50 from the ground. Moreover, the cylinder 40 is shifted from the upright posture to the tilt posture by the rotation of the cylinder 40 about the cylinder rotation axis 40*a*. Furthermore, the float 50 is tilted to the rod 43 of the cylinder 40 so as to lay the bottom surface 51*b* of the float 50 along the part of the machine body 10, the part facing the storage space S, that is, along the storage surface 13*s* of the bottom wall 13*e* shown in FIG. 2 in this embodiment, thereby enabling the entire jack device 20 to be stored in the storage space S. In this embodiment, the float 50 is kept in a horizontal posture, where the bottom surface 51*b* is horizontal, by the weight of the float 50 itself, regardless of the tilt of the cylinder 40; this enables the float 50 to be easily stored on the bottom wall 13*e*.

The reason why the cylinder 40 should be brought into the tilt posture in order to allow the plurality of jack devices 20 to be thus stored in the storage space S is as follows. The car body 13 and the jack device 20 shown in FIG. 1 are integrally transported. This requires the jack device 20 to be stored in the car body 13 so as to confine the car body 13 and the jack device 20 within the limited dimension for transportation. On the other hand, the cylinder 40 shown in FIG. 3 requires a cylinder length, which is the dimension in the cylinder expansion-contraction direction Cz, enough to secure an appropriate jack-up distance. In summary, both the securement of the jack-up distance of the cylinder 40 and the compactification during transportation are required. The tilt posture of the arm 30 as shown in FIG. 2, i.e., the posture tilted from the arm 30, allows the jack device 20 to be stored in the storage space S of the car body 13 in spite that the cylinder 40 has a cylinder length enough to secure the jack-up distance.

The jack device 20 is, more specifically, shifted from the use state to the storage state as follows. The cylinder 40 shown in FIG. 3 is contracted to thereby separate the bottom surface 51*b* of the float 50 upward from the ground (or an interposed object such as a planking). This causes the float 50 to be kept in a posture where the bottom surface 51*b* is horizontal by its own weight. The contraction of the cylinder 40 may involve mutual contact of the second rotation limiting part 75 and the first rotation limiting part 71 shown in FIG. 4. The cylinder 40 is shifted from the upright posture shown in FIG. 3 to the tilt posture while being contracted as described above. More specifically, the cylinder 40 is rotated about the cylinder rotation axis 40*a* relatively to the arm 30 to be laid along the upper surface of the arm 30, as shown in FIG. 2. The arm 30 is then rotated about the arm rotation axis 30*a* to be thereby moved from a position where the arm 30 is projected beyond the car body 13 as shown in the upper part of FIG. 1 so as to make the cylinder 40 and the float 50 closer to the side wall 13*c* of the machine body 10. This enables the whole or substantially the whole of the jack device 20 including the arm 30 to be stored in the storage space S. In other words, the jack device 20 can be shifted to a storage state. In this storage state, the jack device 20 is disposed along the storage surface 13*s* of the car body 13 (e.g., the side surface of the side wall 13*c*). The direction in which the arm center axis 30*b* extends, namely, the arm rotation-radius direction, in the storage state is a direction along the side surface of the side wall 13*c* (i.e., a direction parallel to or substantially parallel to the side wall 13*c*). The jack device 20 only has to be storable in the storage space S, not absolutely required to lie along the storage surface 13*s* (e.g., the side surface of the side wall 13*c*) in the storage state. Beside, not the whole of jack device 20 is required to be stored within the storage space S. Only a part (preferably most) of the jack device 20 is required to be stored within the storage space S.

As described above, the float 50 is kept in the horizontal posture where the bottom surface 51*b* is horizontal, by the self-weight of the float 50, after the separation of the bottom surface 51*b* of the float 50 from the ground surface (or an interposed object such as a floor plate) by the contraction of the cylinder 40, during both the tilt of the cylinder 40 and the rotation of the arm 30. This enables the float 50 to automatically maintain the horizontal posture as shown in FIG. 2, i.e., the posture for reducing the height of the float 50 and suitable for storage, with no application of a special operation to the float 50 by an operator. Specifically, keeping the bottom surface 51*b* horizontal allows the bottom surface 51*b* to be easily laid along the storage surface 13*s*, namely, the top surface, of the bottom wall 13*e* in the storage space S as shown in FIG. 2. Even if the float 50 is hindered from being kept in the horizontal posture by non-smooth rotation of the float 50 about the float main rotation axis 50*a* or foreign matter such as soil adhering to the float 50, the operator can render the bottom surface 51*b* of the float 50 horizontal with a slight manual operation of only slight rotation of the float 50 relative to the float 50 to thereby store the jack device 20 in the storage space S while the float 50 is left connected to the rod 43.

Since the longitudinal direction of the float 50 in the storage state is, as shown in FIGS. 1 and 2, a direction along the arm rotation-radius direction Ax (equal to or substantially equal to the arm rotation-radius direction Ax), the dimension of the float 50 in a direction orthogonal to the side wall 13*c*, namely, the arm width direction Ay in the storage state, that is, the width of the float 50, is reduced. This enables the jack device 20 to be stored in the storage space S while the float 50 is left connected to the rod 43.

Although the bottom surface 51*b* of the float 50 of the jack device 20 in the storage state lies horizontally along the storage surface 13*s* of the bottom wall 131, namely, the upper surface thereof, the bottom surface 51*b* does not absolutely have to be horizontal in the storage state. The float 50 may have either a posture where the bottom surface 51*b* is inclined to a horizontal plane or a posture where the bottom surface is along the up-down direction in the storage state. Besides, the part of the machine body 10 facing the storage space S, along which part the bottom surface 51*b* of the float 50 of the jack device 20 lies in the storage state, that is, the upper surface which is the storage surface 13*s* of the bottom wall 13*e* in the embodiment, does not have to be horizontal. The part may be, for example, either a plane inclined to a horizontal plane or a vertical plane.

The rotation limiter 70 shown in FIG. 4, limiting the rotation of the float 50 about the cylinder center axis 40*c* to the cylinder 40, keeps the longitudinal direction of the float 50 along the arm rotation-radius direction Ax. The necessity of the rotation limitation is as follows. The cylinder 40 has no structure for restricting the rod 43 from rotation about the cylinder center axis 40*c* relative to the tube 41, similar to a typical hydraulic cylinder. Such rotation, if occurring during the expansion-contraction motion of the cylinder 40, causes not only the rod 43 but also the float 50 connected to the rod 43 to be rotated about the cylinder center axis 40*c* relatively to the tube 41. Moreover, the bearing 63, which also allows the pin 61 to be rotated relatively to the rod 43 in the inclination following direction within a predetermined angle range, generates the possibility of rotation of the float 50 connected to the pin 61 relative to the tube 41 about the cylinder center axis 40*c*. The rotation limiter 70 limits the angle of the rotation of the float 50 to the tube 41 about the cylinder center axis 40*c* (hereinafter simply "the rotation angle of the float 50") with the predetermined allowable angle range.

On the other hand, in the state where the float 50 is in contact with the ground and a load is applied to the float 50 from the machine body 10 as shown in FIG. 4, the rod 43 and the float 50 are prevented from the rotation about the cylinder center axis 40*c* and relative to the tube 41 by the frictional force between the float 50 and the ground surface (or a floor plate, etc.). The rotation of the rod 43 and the float 50 relative to the tube 41 about the cylinder center axis 40*c*, therefore, is allowed only within a limited stroke range where the cylinder 40 is contracted to separate the float 50 from the ground. Within the thus limited stroke range, there is little possibility of repeated expansion and contraction of the cylinder 40. That is because the cylinder 40 is normally used only during assembly and disassembly of the work machine 1 and, therefore, the frequency of expansion and contraction thereof is lower than that of a hydraulic cylinder to be used during work performed by the work machine 1. In addition, even in the limited stroke range, the possibility of excessive rotation of the rod 43 and the float 50, on which no external force acts, relative to the tube 41, that is, the possibility of great rotation of the float 50 enough to hinder the float 50 from being stored in the storage space S, is low.

The limit of the rotation angle of the float 50, therefore, does not have to be placed over the entire stroke of the cylinder 40. The rotation limiter 70 is configured to limit the rotation angle of the float 50 within the allowable angle range through mutual contact of the first rotation limiting part 71 and the second rotation limiting part 75 only when the cylinder 40 is contracted. "When the cylinder 40 is contracted" means, for example, when the cylinder 40 is in the most contraction state or a state therearound.

When the cylinder 40 is contracted with deviation of the rotation angle of the float 50 from the allowable angle range, the first rotation limiting part 71 and the second rotation limiting part 75 come into contact with each other to thereby correct (return) the rotation angle of the float 50 to an angle within the allowable angle range. In the example shown in FIG. 4, the first contact part 73*a* contacts the second contact part 75*a* (here, the outer peripheral surface of the pin 61) so as to slide against the second contact part 75*a* along the second contact part 75*a*, thereby returning the rotation angle of the float 50 into the allowable angle range. When the cylinder 40 is contracted in the state where the rotation angle of the float 50 has been already confined within the allowable angle range, the first rotation limiting part 71 and the second rotation limiting part 75 does not have to be in contact with each other.

In each performance of jack work, the jack device 20 is shifted from the storage state shown in FIG. 2 to the use state shown in FIG. 3 and thereafter returned to the storage state from the use state. Every shift of the jack device 20 from the use state to the storage state involves the contraction of the cylinder 40 and confinement of the rotation angle of the float 50 within the allowable angle range. This restrains a minute change in the rotation angle of the float 50 to the tube 41 from being accumulated to generate an increased rotation angle.

In each of the jack devices 20 described above, the pin 61 connects the float 50 to the rod 43 so as to allow the float 50 to rotate greatly about the float main rotation axis 50*a* relatively to the rod 43, for example, compared with the case where the lower end of the spherical rod is placed on the spherical dish-like part of the float, thereby enabling the jack device 20 to be brought into the storage state without detachment of the float 50 from the rod 43. In the storage state, the contraction of the cylinder 40, the shift thereof to the tilt posture, and such rotation of the float 50 relative to the rod 43 that the bottom surface 51*b* of the float 50 lies along the part of the machine body 10 facing the storage space S (the storage surface 13*s* in the embodiment; more specifically, the upper surface of the bottom wall 13*e*) enable the jack device 20 to be easily stored in the storage space S defined by the storage surface 13*s* of the machine body 10.

Moreover, the bearing 63 shown in FIG. 5, interposed between the rod 43 and the pin 61 to allow the float 50 to rotate relative to the rod 43 in an inclination following direction that is other than the direction of the rotation about the float main rotation axis 50*a*, which is the center axis of the pin 61, within a predetermined angle range, enables the float 50 to be inclined following the inclination of the ground. The rotation may be allowed by, for example, forming the cross-section of a pin insertion hole formed in the rod 43 to insert the pin 61 thereinto, into a substantially hyperboloid shape or the like; however, this involves disadvantage of rendering the mutual contact area of the pin 61 and the inner peripheral surface of the rod 43 enclosing the pin insertion hole extremely small to thereby significantly increase the pressure in the mutual contact region. In contrast, the bearing 63 can allow the float 50 to make relative rotation to the rod 43 in the inclination following direction while rendering each of the mutual contact area of the inner ring 63*b* of the bearing 63 and the outer peripheral surface of the pin 61, the mutual contact area of the outer peripheral surface of the inner ring 63*b* and the outer ring 63*a* of the bearing 63, and the mutual contact area of the outer ring 63*a* and the inner peripheral surface of the rod 43 large to thereby restrain excessive pressure from occurring.

Furthermore, the jack device 20, including the first rotation limiting part 71 rotatable with the tube 41 and the second rotation limiting part 75 rotatable with the float 50, the second rotation limiting part 75 being contactable with the first rotation limiting part 71 when the cylinder 40 is contracted, can limit the angle of the rotation of the float 50 relative to the tube 41 about the cylinder center axis 40*c* within an allowable angle range.

In addition, the second rotation limiting part 75, which comes into contact with the first rotation limiting part 71 so as to guide the float 50 to a position where the rotation angle is confined within the allowable angle range along with the contraction of the cylinder 40 with the deviation of the rotation angle of the float 50 to the tube 41 from the allowable angle range, enables the rotation angle of the float 50 to be automatically confined within the allowable angle range according to the contraction motion of the cylinder 40. This renders an operator free from necessity of manually rotating the float 50 to confine the angle of rotation of the float 50 within the allowable angle range. The confinement of the rotation angle of the float 50 within the allowable angle range, that is, the confinement of the rotation angle of the float 50 to the machine body 10 within a predetermined range, allows the longitudinal direction of the float 50 in the storage state of the jack device 20 to be an appropriate direction along the storage surface 13*s* (the side surface of the side wall 13*c* in the embodiment), thereby enabling the jack device 20 to be more easily stored in the storage space S.

The second rotation limiting part 75 according to the embodiment, composed of the outer peripheral surface of the pin 61, requires no addition of any special member dedicated to rotation limiter as the second rotation limiting part 75. Besides, since the posture of the pin 61, which constitutes the second rotation limiting part 75, to the tube 41 is constant or substantially constant regardless of the expansion/contraction of the cylinder 40 and the posture of the float 50 to the rod 43 (e.g., the rotation angle of the float 50 about the float main rotation axis 50*a*), the second rotation limiting part 75 can be reliably brought into contact with the first rotation limiting part 71 regardless of the posture of the float 50 to the rod 43. This enables the rotation angle of the float 50 to be reliably confined within the allowable angle range.

Next will be described a jack device 220 according to a second embodiment of the present invention, with reference to FIGS. 7 and 8. Description is omitted about a common part to the jack device 20 according to the first embodiment, out of the jack devices 220 according to the second embodiment, and the difference between the jack device 220 and the jack device 20 is mainly described.

Figure 7:
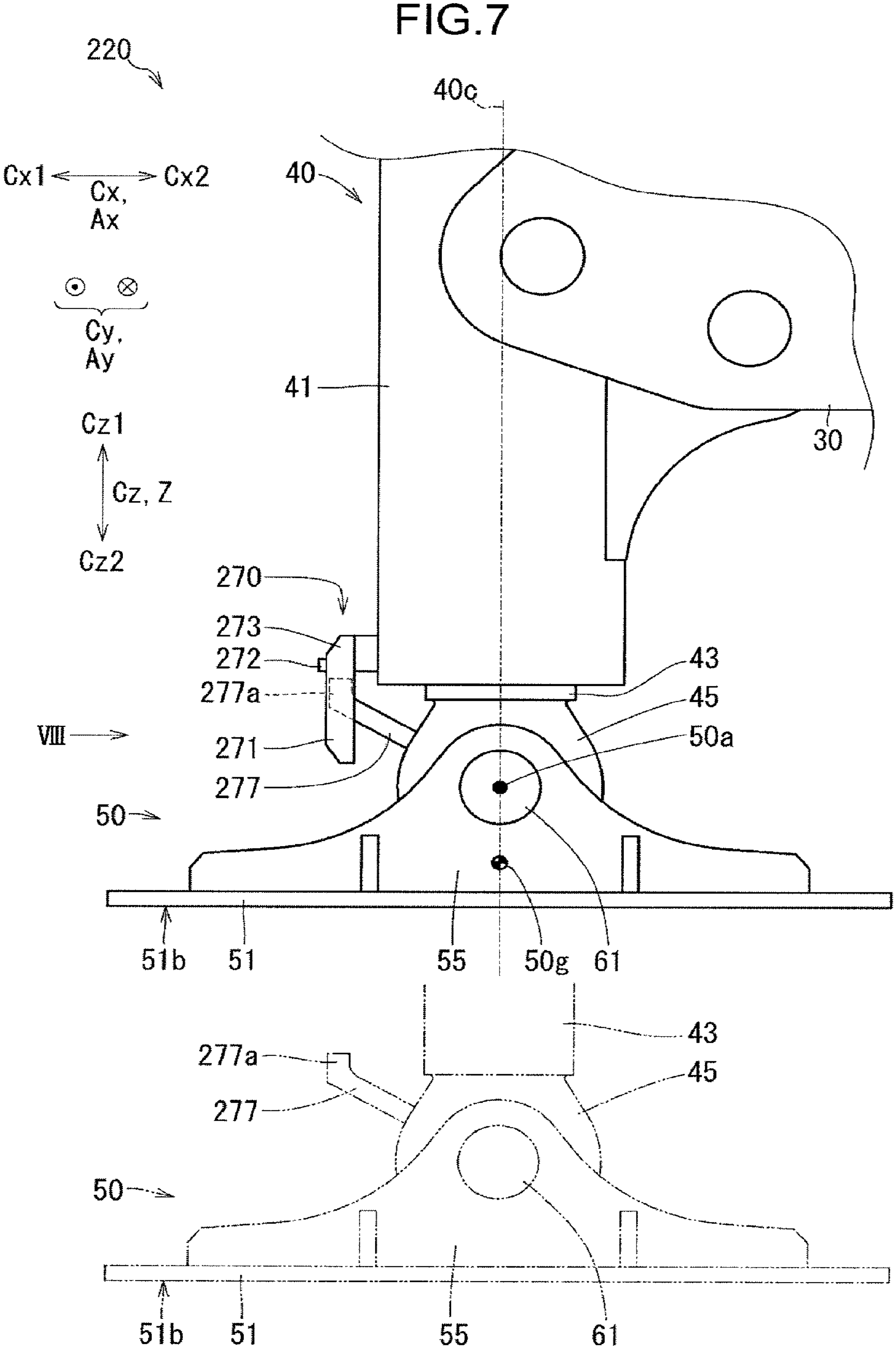
FIG. 7 is a view showing a float and a peripheral part therearound in a jack device according to a second embodiment of the present invention, corresponding to FIG. 4.
Figure 8:
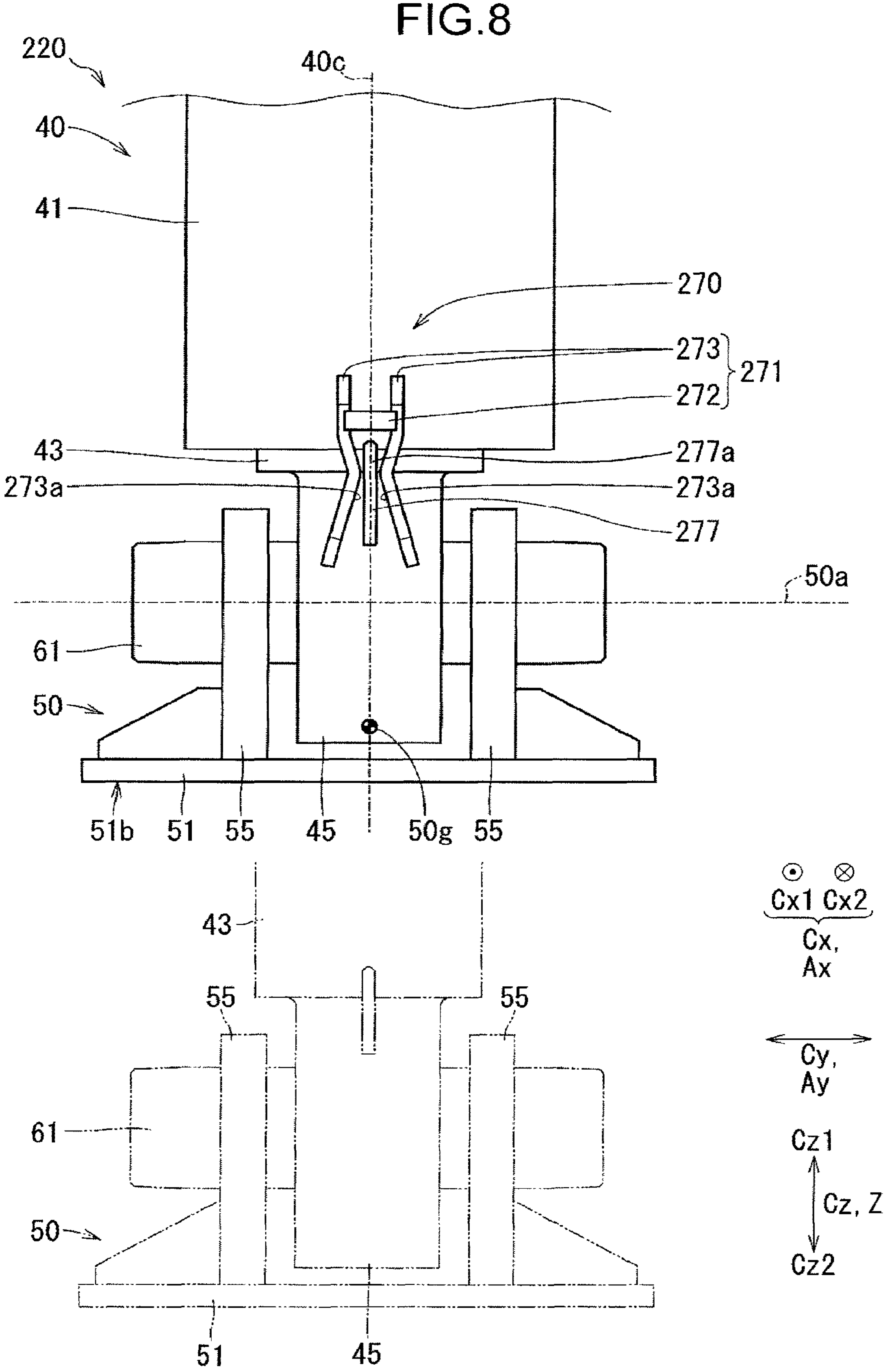
FIG. 8 is a view of the float and the peripheral part therearound in the jack device according to the second embodiment taken along the direction indicated by arrow VIII in FIG. 7.

The difference includes that the jack device 220 includes a rotation limiter 270 shown in FIGS. 7 and 8 in place of the rotation limiter 70 of the jack device 20. As shown in FIG. 4, the rotation limiter 70 according to the first embodiment limits the rotation angle of the float 50 to the tube 41 by confining the rotation angle about the cylinder center axis 40*c* of the pin 61 to the tube 41 within a predetermined angle range, whereas the rotation limiter 270 shown in FIG. 7 according to the second embodiment limits the rotation angle of the float 50 to the tube 41 within a predetermined allowable angle range by limiting the angle of rotation of the rod 43 relative to the tube 41 about the cylinder center axis 40*c* within a predetermined angle range.

The rotation limiter 270 includes a first rotation limiting part 271 and a second rotation limiting part 277.

The first rotation limiting part 271 is fixed to an appropriate part of the tube 41, for example, a part facing in the cylinder front direction Cx1 as shown in FIG. 7. The first rotation limiting part 271 includes a connection part 272 and a pair of rotation limiting members 273, 273. The connection part 272 interconnects the pair of rotation limiting members 273, 273. The connection part 272 is fixed to the tube 41.

The pair of rotation limiting members 273, 273 are spaced in the cylinder width direction Cy. Each of the rotation limiting members 273, 273 may be, for example, either a plate-like or a block-like. The rotation limiting member 273 includes a first contact part 273*a*, which is contactable with the second rotation limiting part 277. The first contact part 273*a* protrudes in the cylinder down direction Cz2 beyond the end part of the rotation limiting member 273 in the cylinder lower direction Cz2 of the tube 41 (namely, the lower end). The first contact part 273*a* is inclined to the cylinder expansion-contraction direction Cz. Specifically, it extends in a combined direction of the cylinder down direction Cz2 and the out direction in the cylinder width direction Cy (the direction away from the cylinder center axis 40*c*).

The second rotation limiting part 277 is provided to the rod 43. More specifically, as shown in FIG. 7, the second rotation limiting part 277 is fixed to a part in the vicinity of the end of the rod 43 in the cylinder down direction Cz2, for example, the float connection part 45. The second rotation limiting part 277 protrudes from, for example, a part of the float connection part 45 that faces in the cylinder front direction Cx1 in a combined direction of the cylinder front direction Cx1 and the cylinder contraction direction Cz1, that is, obliquely upward in FIG. 7. The second rotation limiting part 277 may be either plate-like or block-like. In the example shown in FIG. 7, the second rotation limiting part 277 is a bar that is plate-like and substantially rod-like.

The second rotation limiting part 277 includes a second contact part 277*a*. The second contact part 277*a* is contactable with respective first contact parts 273*a* of the pair of the rotation limiting members 273, being, in this embodiment, a protruding end part of the second rotation limiting part 277, that is, the end part in the cylinder front direction Cx1. The second contact part 277*a* is caused to enter a space between the pair of rotation limiting members 273, 273, by the contraction of the cylinder 40 with the angle of rotation of the float 50 relative to the tube 41 within the allowable angle range, to be located between the first contact parts 273*a*, 273*a* of the pair of rotation limiting members 273, 273 in a state where the cylinder 40 is most contracted as indicated by the solid lines shown in FIGS. 7 and 8.

The configuration of the rotation limiter 270, especially the shape and arrangement, is modifiable in various ways. For example, the arrangement where the first rotation limiting part 271 includes the pair of rotation limiting members 273, 273 between which the second rotation limiting part 277 is disposed as shown in FIG. 8 can be replaced with an arrangement in which the second rotation limiting part 277 includes a pair of rotation limiting members between which the first rotation limiting part 271 is disposed.

The second rotation limiting part 277 also can confine the rotation angle of the float 50 to the tube 41 within the allowable angle range by limiting the angle of rotation of the rod 43 to the tube 41 about the cylinder center axis 40*c*. Besides, along with the contraction of the cylinder 40 with the deviation of the rotation angle of the float 50 to the tube 41 from the allowable angle range, the second contact part 277*a* of the second rotation limiting part 277 is guided along the first contact part 273*a* in sliding contact against the first contact part 273*a* of either of the rotation limiting members 273. This enables the rod 43 and the float 50 connected to the rod 43 to be guided to a position where the rotation angle of the front float 50 is confined within the allowable angle range.

Figure 9:
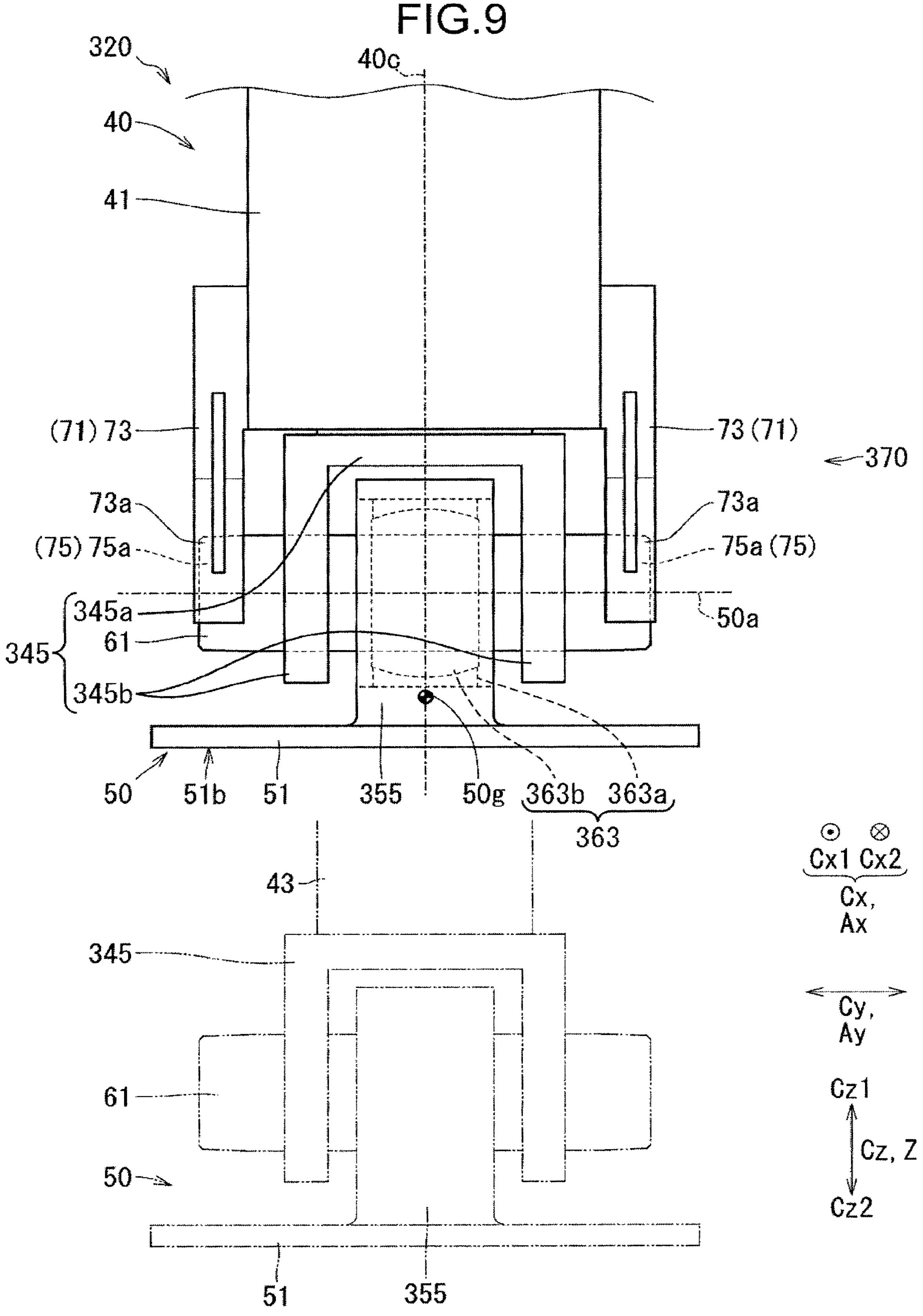
FIG. 9 is a view showing a float and a peripheral part therearound in a jack device according to a third embodiment of the present invention, corresponding to FIG. 5.

With reference to FIG. 9, there will be described a jack device 320 according to a third embodiment of the present invention.

The jack device 320 according to the third embodiment differs from the jack device 20 according to the first embodiment in the following respects. The float 50 and the rod 43 of the jack device 20 according to the first embodiment include the rod connection part 55 and the float connection part 45, respectively, while the jack device 320 according to the third embodiment also includes a float 50 and a rod 43 of a cylinder 40 but the float 50 and the rod 43 include a rod connection part 355 and a float connection part 345 shown in FIG. 9, respectively. Besides, the jack device 320 includes a bearing 363 shown in FIG. 9 in place of the bearing 63 of the jack device 20.

The float connection part 345 integrally includes a base part 345*a* and a pair of pin holding parts 345*b*. The base part 345*a* is joined with an end part of the body shaft of the rod 43 in the cylinder expansion direction Cz2 (namely, a lower end part). The pair of pin holding parts 345*b* protrude from opposite ends of the base part 345*a* with respect to the cylinder width direction Cy in the cylinder expansion direction Cz2, respectively, to support the pin 61. The pin 61 is fixed to the pair of pin holding parts 345*b* while penetrating the pair of pin holding parts 345*b* in the cylinder width direction Cy, respectively.

The rod connection part 355 is disposed between the pair of pin holding parts 345*b*, and the bearing 363 is interposed between the rod connection part 355 and the pin 61. The bearing 363 includes an outer ring 363*a* and an inner ring 363*b* similar to the outer ring 63*a* and the inner ring 63*b* of the bearing 63, wherein the outer ring 363*a* is fixed to the rod connection part 355 while the inner ring 363*b* is fixed to the outer peripheral surface of the pin 61. The bearing 363 allows the float 50 to rotate relatively to the pin 61 in the inclination following direction within a predetermined range, thereby allowing the float 50 to rotate relatively to the rod 43 in the inclination following direction within a predetermined angle range.

The jack device 320 includes a rotation limiter 370 similar to the rotation limiter 70 according to the first embodiment shown in FIG. 5. The function of the rotation limiter 370 is substantially equivalent to the function of the rotation limiting section 270 according to the second embodiment shown in FIG. 8. Specifically, the rotation limiter 370 limits the rotation of the pin 61 relative to the tube 41 of the cylinder 40 about the cylinder center axis 40*c* to thereby limit the rotation of the rod 43 and the float 50 relative to the tube 41 about the cylinder center axis 40*c*.

The embodiments described above may be variously modified. For example, components of different embodiments may be combined with each other. For example, the arrangement and shape of each component may be changed. For example, the number of components may be changed and some of the components may not be provided. For example, the fixation, connection, etc. of the components may be direct or indirect. For example, what has been described as a plurality of members or parts different from each other may be one member or part. For example, what has been described as one member or part may be divided into a plurality of members or parts different from each other.

For example, there can be a combination of the rotation limiter 70 to limit the rotation of the float 50 to the tube 41 shown in FIG. 5 and the rotation limiter 270 to limit the rotation of the rod 43 to the tube 41 shown in FIG. 8. The combination enables the float 50 to be reliably maintained at a position where the longitudinal direction of the float 50 is along the arm rotation-radius direction Ax.

A means other than the bearing 63 may allow the float 50 to follow the inclination of the ground while securing the required strength. For example, at least one of the rod connection part 55 and the float connection part 45 may be provided with a pin insertion hole into which the pin 61 can be inserted with a gap between the inner peripheral surface enclosing the pin insertion hole and the outer peripheral surface of the pin 61, the gap having a size large enough to allow the float 50 to follow the inclination of the ground.

Alternatively, the pin insertion hole may have a cross-sectional shape capable of allowing the pin 61 to tilt from the center axis of the pin insertion hole, such as a hyperbolic or substantially hyperbolic shape.

As above is provided a jack device to be provided in a work machine capably of being easily stored in a machine body of the work machine. The machine body defines a storage space for storing the jack device. The jack device includes an arm, a cylinder, a float, and a pin. The arm is connectable to the machine body rotatably about an arm rotation axis. The arm rotation axis extends in a machine up-down direction, which is an up-down direction of the machine body. The cylinder includes a tube and a rod. The tube holds the rod so as to allow the rod to be moved relatively to the tube in a cylinder expansion-contraction direction. The entire cylinder is expanded and contracted in the cylinder expansion-contraction direction by a relative movement of the rod to the tube. The tube is connected to the arm so as to allow the cylinder to rotate about a cylinder rotation axis to have an upright posture and a tilt posture. The float has a bottom surface placeable on the ground. The pin connects the float to a lower end of the rod so as to allow the float to rotate about a float rotation axis extending in a direction along the cylinder rotation axis. The upright posture is a posture where the cylinder expansion-contraction direction is parallel to the machine up-down direction. The tilt posture is a posture where the cylinder expansion-contraction direction is tilted from the machine up-down direction so as to allow the jack device to be stored in the storage space with a contraction of the cylinder in the cylinder expansion-contraction direction. The pin allows the float to rotate relatively to the rod enough to allow the bottom surface of the float of the jack device in the tilt posture to lie along a facing part of the machine body that faces the storage space to thereby allow the jack device to be stored in the storage space.

The jack device is shiftable between a use state and a storage state by rotation about the arm rotation axis of the arm. In the use state, the cylinder in the upright posture can be expanded to lift up the machine body relatively to the ground. In contrast, contracting the cylinder and bringing the cylinder into the tilt posture, and rotating the float relatively to the rod to lay the rod along the facing part of the machine body that faces the storage space enables the jack device to be easily stored in the storage space without detachment of the float from the rod.

Preferably, the jack device further includes a bearing, which is provided between the pin and at least one of the rod and the float to allow the float to make a relative rotation to the rod within a predetermined angle range. The relative rotation includes a rotation in a direction other than a direction of rotation about a center axis of the pin, allowing the float to be tilted following the inclination of the ground.

Preferably, the jack device further includes a first rotation limiting part provided in the tube and a second rotation limiting part contactable with the first rotation limiting part when the cylinder is contracted. The second rotation limiting part is configured to limit an angle of rotation of the float about a center axis of the cylinder relative to the tube within an allowable angle range by contact with the first rotation limiting part. The limitation of the angle of the rotation stabilizes the posture of the float relative to the tube. This enables the jack device to lift up the machine body more stably in the use state and enables the jack device to be more easily stored in the storage space.

The second rotation limiting part is, preferably, configured to come into contact with the first rotation limiting part so as to guide the float to a position where the rotation angle of the float relative to the tube is confined within the allowable angle range along with a contraction of the cylinder with a deviation of the rotation angle from the allowable angle range. This allows the posture of the float to be automatically corrected to a preferred posture along with the contraction of the cylinder, thereby reducing the burden on the operator.

The second rotation limiting part is, for example, an outer peripheral surface of the pin, and preferably configured to limit the rotation of the pin to the tube by contact of the second rotation with the first rotation limiting part. This eliminates the necessity of adding a dedicated member as the second rotation limiting part.

The second rotation limiting part, alternatively, may be provided in the rod to limit rotation of the rod relative to the tube by contact of the second rotation limiting part with the first rotation limiting part.

Also provided is a work machine comprising a machine body defining a storage space and the above-described jack device mounted on the machine body. The jack device is shiftable between a use state and a storage state by rotation of the arm relative to the machine body about the arm rotation axis. In the use state, the jack device is projected to an outside of the storage space beyond the machine body to be able to lift up the machine body by expansion of the cylinder in the upright posture. In the storage state, the jack device is stored in the storage space while the cylinder is contracted and in the tilt posture, the float being in a posture along the storage surface.

It is preferable that the machine body includes, for example, a side wall, a top wall connected to an upper end of the side wall and including an upper projecting part that projects horizontally beyond the side wall, and a bottom wall connected to a lower end of the side wall and including a lower projecting part that projects horizontally beyond the side wall, the storage surface including an outer side surface of the side wall, a lower surface of the top wall, and an upper surface of the bottom wall, wherein the bottom surface of the float of the jack device where the cylinder is in the tilt posture is capable of lying along the storage surface. This enables a storage space suitable for storing the jack device to be formed by utilization of the side walls, the top wall and the bottom wall, which constitute the machine body.

In this case, the float is preferably rotatable relatively to the rod enough to reach a posture where the bottom surface of the float lies along the top surface of the bottom wall in the storage state. This enables the jack device to be stored above the bottom wall in a stable state.

Furthermore, it is preferable that the float has a shape that causes the float to be maintained in the horizontal posture, which is a posture where the bottom surface is horizontal, by a self-weight of the float regardless of the rotation of the cylinder about the cylinder rotation axis. This makes it possible to reduce the burden of operator to perform operation of bringing the float into the horizontal posture in order to store the jack device in the storage space.

The invention claimed is:

1. A jack device to be mounted on a machine body of a work machine, the machine body defining a storage space, the jack device being capable of lifting up the machine body and storable in the storage space, the jack device comprising:

an arm connectable to the machine body rotatably about an arm rotation axis extending in a machine up-down direction, which is an up-down direction of the machine body;

a cylinder that includes a tube and a rod, the tube holding the rod so as to allow the rod to be moved relatively to the tube in a cylinder expansion-contraction direction, the entire cylinder being expanded and contracted in the cylinder expansion-contraction direction by a relative movement of the rod to the tube, the tube being connected to the arm so as to allow the cylinder to rotate about a cylinder rotation axis to have an upright posture and a tilt posture;

a float connected to a lower end part of the rod, the float having a bottom surface placeable on the ground;

a pin that connects the float to a lower end of the rod so as to allow the float to rotate about a float rotation axis extending in a direction along the cylinder rotation axis;

a first rotation limiting part provided on the tube and;

a second rotation limiting part contactable with the first rotation limiting part when the cylinder is contracted, wherein:

the upright posture is a posture where the cylinder expansion-contraction direction is parallel to the machine up-down direction, and the tilt posture is a posture where the cylinder expansion-contraction direction is tilted from the machine up-down direction so as to allow the jack device to be stored in the storage space with a contraction of the cylinder in the cylinder expansion-contraction direction;

the pin is configured to allow the float to rotate relatively to the rod enough to allow the bottom surface of the float of the jack device in the tilt posture to lie along a facing part of the machine body that faces the storage space to thereby allow the jack device to be stored in the storage space; and the second rotation limiting part is configured to limit an angle of rotation of the float relative to the tube about a center axis of the cylinder within an allowable angle range by contact of the second rotation limiting part with the first rotation limiting part.

2. The jack device according to claim 1, further comprising a bearing provided between the pin and at least one of the rod and the float to allow the float to make a relative rotation to the rod within a predetermined angle range, the relative rotation including a rotation in a direction other than a direction of rotation about a center axis of the pin.

3. The jack device according to claim 1, wherein the second rotation limiting part is configured to come into contact with the first rotation limiting part so as to guide the float to a position where a rotation angle of the float relative to the tube is confined within the allowable angle range along with a contraction of the cylinder with a deviation of the rotation angle from the allowable angle range.

4. The jack device according to claim 1, wherein the second rotation limiting part is an outer peripheral surface of the pin, configured to limit a rotation of the pin relative to the tube by contact of the second rotation limiting part with the first rotation limiting part.

5. The jack device according to claim 1, wherein the second rotation limiting part is provided in the rod to limit a rotation of the rod relative to the tube by contact of the second rotation limiting part with the first rotation limiting part.

6. A work machine comprising:

a machine body defining a storage space; and a jack device, mounted on the machine body, the jack device including:

an arm connectable to the machine body rotatably about an arm rotation axis extending in a machine up-down direction, which is an up-down direction of the machine body;

a cylinder that includes a tube and a rod, the tube holding the rod so as to allow the rod to be moved relatively to the tube in a cylinder expansion-contraction direction, the entire cylinder being expanded and contracted in the cylinder expansion-contraction direction by a relative movement of the rod to the tube, the tube being connected to the arm so as to allow the cylinder to rotate about a cylinder rotation axis to have an upright posture and a tilt posture:

a float connected to a lower end part of the rod, the float having a bottom surface placeable on the ground; and a pin that connects the float to a lower end of the rod so as to allow the float to rotate about a float rotation axis extending in a direction along the cylinder rotation axis, wherein:

the jack device is shiftable between a use state where the jack device is projected to an outside of the storage space beyond the machine body to be able to lift up the machine body by expansion of the cylinder in the upright posture and a storage state where the jack device is stored in the storage space, by rotation of the arm relative to the machine body about the arm rotation axis, the storage state being a state where the cylinder is in the tilt posture and the float is in a posture along a facing part of the machine body that faces the storage space;

the machine body includes a side wall, a top wall connected to an upper end of the side wall and including an upper projecting part that projects horizontally beyond the side wall, and a bottom wall connected to a lower end of the side wall and including a lower projecting part that projects horizontally beyond the side wall;

the arm rotation axis passes through the upper projecting part and the lower projecting part in the machine up-down direction, and the cylinder rotation axis extends in a direction orthogonal to each of the machine up-down direction and an arm rotation-radius direction, which is a direction parallel to a radius of rotation of the arm about the arm rotation axis; and the storage space is defined by a storage surface of the machine body, the storage surface including an outer side surface of the side wall, a lower surface of the top wall, and an upper surface of the bottom wall; and the bottom surface of the float of the jack device where the cylinder is in the tilt posture is capable of lying along the storage surface.

7. The work machine according to claim 6, wherein the float is rotatable relatively to the rod enough to reach a posture where the bottom surface of the float lies along a top surface of the bottom wall in the storage state.

8. The work machine according to claim 7, wherein the float has a shape that causes the float to be maintained in a horizontal posture by a self-weight of the float regardless of the rotation of the cylinder about the cylinder rotation axis, the horizontal posture being a posture where the bottom surface is horizontal.

* * * * *